July 24, 1956 D. A. LYON 2,756,165
ELECTRICALLY CONDUCTING FILMS AND PROCESS FOR FORMING THE SAME
Filed Sept. 15, 1950 3 Sheets-Sheet 2

INVENTOR:
Dean A. Lyon,
BY
Cushman, Darby & Cushman
ATTORNEYS.

July 24, 1956 D. A. LYON 2,756,165
ELECTRICALLY CONDUCTING FILMS AND PROCESS FOR FORMING THE SAME
Filed Sept. 15, 1950 3 Sheets-Sheet 3
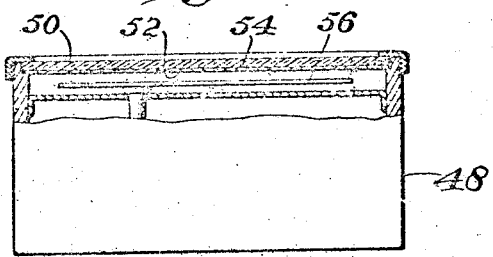
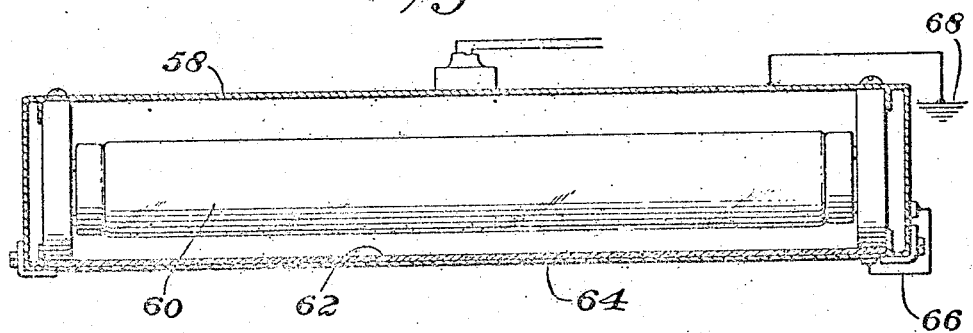
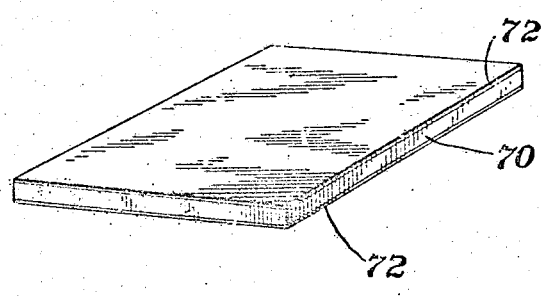
INVENTOR:
Dean A. Lyon,
BY Cushman, Darby & Cushman
ATTORNEYS.

United States Patent Office 2,756,165
Patented July 24, 1956

2,756,165

ELECTRICALLY CONDUCTING FILMS AND PROCESS FOR FORMING THE SAME

Dean A. Lyon, Washington, D. C., assignor to the United States of America as represented by the Secretary of the Navy Application September 15, 1950, Serial No. 185,051

17 Claims. (Cl. 117—211)

This invention relates to the product formed and the process for forming an electrically conducting coating or film on the surfaces of solid supporting materials or bodies such as plastics, paper, leather, ceramics, quartz, wood, glass, and crystals used in electronics and optics such as alkali halides, ammonium and potassium dihydrogen phosphates, lithium fluoride, calcium fluoride, titanium dioxide, and the like.

The prior art teaches the application of thin films to the surfaces of high melting point substances such as ceramics and glass so as to provide a film which is an electrical conductor. Some of these conducting films are highly colored and/or opaque whereas others are transparent and essentially colorless and capable of transmitting a high percentage of visible light. However, the methods of the prior art for applying these electrically conducting films involve the use of high temperatures in excess of 200° C. and usually in the range of 450 to 800°.

There is, for example, a prior art method of applying a conducting film of a compound of silicon to ceramics in which the ceramic article to be coated is heated to a temperature of 200–400° C. and is then subjected to the vapor of silicon tetrachloride. An iridescent but non-conducting film of a compound of silicon is formed on the article by this treatment. The film is then rendered electrically conducting by again heating the coated article to a temperature of 200–400° C. in a reducing atmosphere.

Another example of the prior art for producing a conducting film includes spraying an appropriate tin compound dissolved in an organic solvent to which a little water has been added against a glass surface which has been heated almost to the softening point.

All of these particular prior art methods and others have the disadvantage that they are limited to the deposition of a film on a material which will withstand temperatures of at least 200° C. and usually temperatures of from 450 to 800° C. A most important advantage of the present invention over these prior art methods is that the films produced as described herein may be coated on articles which are at substantially room temperature, i. e., 20° C. to 23° C., or even below room temperature. The invention enables heat sensitive materials such as those described above to be coated with an electrically conducting coating as well as permitting heat resistant ceramics and glasses to be coated.

Accordingly a principal object of the present invention is to provide the surface of a solid supporting body with an electrically conducting coating or film which may be produced if desired at room temperature or below and does not require the high temperatures used by the prior art processes.

Another object of this invention is to provide the surface of a solid body with an electrically conducting transparent coating or film of cuprous iodide.

A further object of this invention is to provide a new process for forming an electrically conducting coating on a heat sensitive solid body such as, for example, a plastic, wood, leather, or crystalline material used in electronics or optics. Furthermore, if it is desired, the coating may be made transparent.

Another object of the invention is to provide a new process for producing an electrically conducting coating on a ceramic or glass or other high melting point material where it is sometimes undesirable or impractical to utilize other processes which require the use of high temperatures. This film or coating may be transparent if desired.

Another object of this invention is to provide a process for forming an electrically conducting coating or film on the surface of an electrically non-conducting heat sensitive transparent material. This coating or film may be transparent if desired.

Still another object of this invention is to provide an article in the form of a solid body coated with an electrically conducting coating which is preferably but not necessarily transparent. The solid body coated by the films of this invention may be heat sensitive and/or non-conducting, and a preferred form of the article is a heat sensitive transparent body coated with a conducting transparent film.

These and other objects of this invention will become apparent upon consideration of the following description taken in connection with the drawings wherein:

Figure 4 is an elevational view partially in cross section showing schematically an electrical or mechanical meter employing a sight window made in accordance with this invention;

Figure 5 is a cross-sectional view showing schematically a gaseous discharge lamp employing a light opening made in accordance with this invention; and Figure 6 is a perspective view of an electrical condenser made in accordance with this invention.

Figure 1:
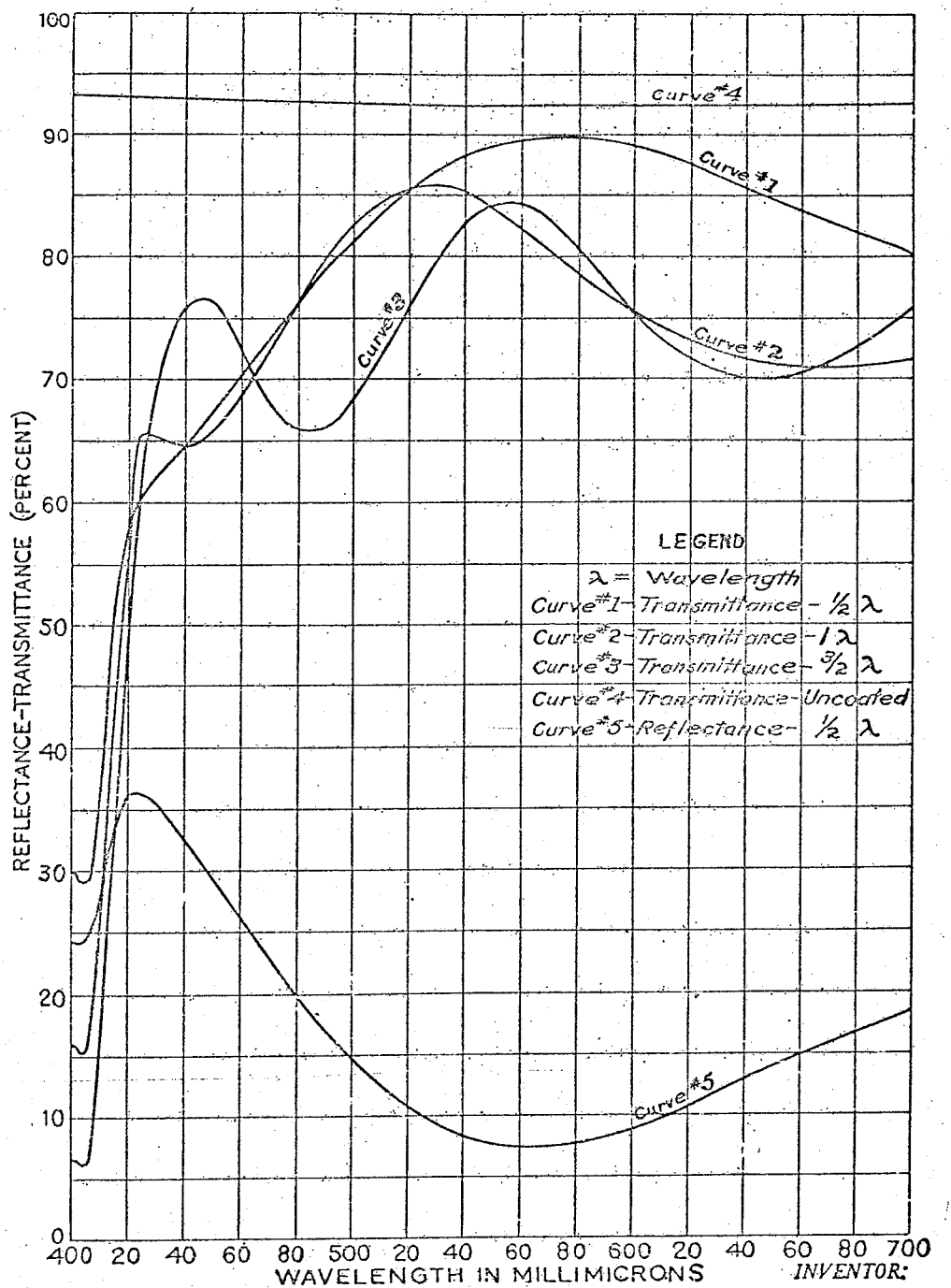
Figure 1 is a graphical illustration of reflectance and transmittance in per cent for various wavelengths of light of various thickness films of this invention coated on transparent plastic.

I have discovered that the chemical compound known as cuprous iodide (CuI) may be applied to a surface which is at room temperature or even below in accordance with the process of the three exemplary methods described hereinafter to produce a coating or film which is a good conductor of electricity, transmits a high percentage of visible light and has but little optical absorption.

Since the thicknesses of these films of cuprous iodide are extremely minute, it is most convenient to express film thickness in terms of wavelengths of light. The arbitrary reference standard chosen is monochromatic light having a wavelength of 550 millimicrons. This value has been selected since it represents the position in the visible spectrum most sensitive to the human eye. Where reference is made in this specification to the "thickness" of a film, it is understood to be the "optical thickness" and not the actual mechanical thickness. The optical thickness is equal to the mechanical thickness multiplied by the index of refraction of the film.

Although electrically conducting films many wavelengths thick may be made by this process, I have generally not succeeded in making clear transparent films having a thickness greater than about two wavelengths. Films thicker than two wavelengths are normally milky or cloudy in appearance and as the thickness increases the films approach translucency. Hence, the effective range of usefulness where transparency is a prerequisite, is limited to a maximum thickness of substantially two wavelengths. Films of such minute thickness exhibit well known and understood optical effects connected with the constructive and destructive interference of light. Since the index of refraction of cuprous iodide (2.35) is much higher than that of the usual materials on which the film is formed, it will be understood by those skilled in the art that films which are ¼ wavelengths and odd integer multiples thereof (such as ¾, 5/4, 7/4, etc.) in thickness, will exhibit maximum reflection, and minimum transmission, of light. On the other hand, films which are even integer multiples of ¼ wavelength in thickness (such as 2/4, 4/4, and 6/4, etc.) exhibit minimum reflection and maximum transmission of light. Hence, it follows from these considerations that if maximum transmission, i. e., maximum transparency, is a requirement, then the films should be made 2/4, 4/4, 6/4, etc., wavelengths thick. On the other hand, if high reflection of light is a primary requirement and transmission a secondary and unimportant requirement, then the film should be made ¼, ¾, 5/4, etc., wavelengths thick.

It is a characteristic of thin films to exhibit color when illuminated by white light, such as daylight. The theory of formation of these colors in thin films is well known to those skilled in the art, and no extended discussion of the same, therefore, appears necessary. Cuprous iodide films which are odd multiples of ¼ wavelength in thickness have a yellowish-green hue by reflected light, whereas those which are even multiples of ¼ wavelength in thickness, appear reddish-purple by reflected light. Other colors than those mentioned signify film thicknesses which lie between even and odd multiples of ¼ wavelength in thickness. These colors provide a convenient and simple method for determining film thickness by visual examination. Hence, to produce films of maximum transparency, the thickness should be such that a reddish-purple reflection is observed. To produce films of maximum reflection, the thickness should be such that a yellowish-green reflection is observed.

It has been experimentally determined that the films of this invention are equally effective as conductors whether used under normal atmospheric pressure conditions or under vacuum conditions.

The electrical resistance measured across opposite sides of a square film made in accordance with this invention is dependent upon the thickness of the cuprous iodide film and upon its crystalline structure. The resistance of the best quality films which show little, if any, cloudiness, is lower than films of equal thickness which show cloudiness. Since it is virtually impossible to prepare films which are absolutely uniform in crystalline structure, it is difficult to state a definite single value for the resistance per square of any given thickness of film. The following table shows the order of magnitude of the resistance per square as a function of thickness:

| Thickness of Film | Resistance, Ohms Per Square |
| --- | --- |
| ¼ wavelength | 8,000–10,000 |
| ½ wavelength | 4,000 |
| 1 wavelength | 2,000 |
| 2 wavelength | 1,000 |

If the thickness of the film is below ¼ wavelength, the resistance values increase much more rapidly than would be suggested by the proportional values given in the table. I have made transparent films which initially measured as low as 150 ohms per square in resistance, but it has been impossible to maintain these values over any extended period of time, and I have been unable to duplicate these values consistently. If transparency of the film is not required, films greater than two wavelengths thick may be made and lower resistances thereby obtained.

Figure 1 of the drawings graphically illustrates the exceedingly good quality of transmission of coated articles by this invention. The specimens used for the determination of reflection and transmission in per cent for various wavelengths of light in millimicrons were ⅛" thick sheets of "Plexiglas" coated in accordance with the process of this invention with a film of cuprous iodide on one side thereof. The optical thicknesses of the films coated on the various specimens as indicated respectively in curves 1, 2 and 3 are ½ wavelength, 1 wavelength and 3/2 wavelength. For the purpose of comparison, curve 4 represents the per cent transmission of light through an uncoated plastic sheet of the same material and thickness. Also, curve 5 is a plot of the per cent reflection of the ½ wavelength thickness coated cuprous iodide film on the ⅛" thick "Plexiglas" sheet. The other reflection curves for the 1 wavelength and 3/2 wavelength thick films have not been plotted in order to avoid crowding of the graphical representations.

It is to be noted, for example, that the maximum transmission of the ½ wavelength thickness film coated on "Plexiglas" is approximately 90% and that this maximum transmission occurs at a wavelength of about 575 millimicrons. This percentage transmission is only about 2½% less than the transmission of the uncoated plastic sheet at the same wavelength of light. Similarly, it is seen that the maximum transmission of the 1 wavelength optical thickness film coated on an identical sheet of "Plexiglas" occurs at approximately 530 millimicrons wavelength with a percentage transmission of approximately 86%. Also, the 3/2 wavelength thickness film indicates that a maximum percentage transmission of approximately 84% occurs at a wavelength of light of 555 millimicrons. These latter per cent transmission values also represent an unusually high transmission of light as compared with the uncoated plastic at the same wavelength of light.

The reflection curve for the ½ wavelength film thickness further indicates that approximately only 7.5% light is reflected at that wavelength of light where maximum transmission occurs.

If the absorption of light for the ½ wavelength thick film is calculated over the entire visible spectrum, it will be found that its average value is about 2½% for the entire range except in the region 400 to 430 millimicrons where a very rapid increase occurs.

An examination of the curves of Figure 1 shows the outstanding transmission characteristics of these films. These high transmission values are also accompanied by remarkably low absorption losses. The curves of Figure 1 are reproductions of those obtained from a recording spectrophotometer.

In my work with the coated articles of this invention, I have found that an electrical connection may be made with the conducting films of cuprous iodide by several convenient means. One method is the application of colloidal silver paint to the film at a convenient point where electrical connection is desired. Another method is the evaporation of gold to form a place of contact where connection is desired. A third method is pressure contact between a strip or ring of metal such as brass, copper, silver or another conductor and the film. Each of these methods provide for easy connection of electrical conductors.

I have found that protective films may be applied to the cuprous iodide coated articles of this invention where it is necessary or desirable to prevent mechanical action from injuring these films. Examples of agents usable for forming the protective medium are "Krylon," transparent lacquers, and evaporated films of suitable inorganic salts, such as magnesium fluoride and silicon monoxide. These protective films do not appear to interfere with the conductivity of the cuprous iodide films.

Irrespective of the method which is chosen for forming a cuprous iodide film on a supporting surface, it is essential that absolute cleanliness of the surface be obtained before attempting to coat. There are many methods used commercially for obtaining a clean surface, such as the "glow discharge" method in a vacuum chamber and the use of various organic chemicals and detergents. The scope of this invention should not be restricted to any particular method of cleaning, since the cleaning operation is merely a prerequisite for obtaining a high quality film free from streaks and blemishes.

The process for producing the coating or films of this invention comprises the deposition of minute cuprous iodide crystals on a supporting surface whose temperature does not need to exceed that of room temperature. This process may be carried out by a variety of methods, but the following are the preferred methods which I have used and are in the order of their preference for reasons explained in connection with each of the methods.

METHOD I

In my preferred method, a coating of cuprous iodide is formed in two separate operations. The first step or operation is the application of a thin film of metallic copper to the surface of an article to be coated, for example, a sheet of transparent plastic such as cellulose acetate, methyl methacrylate, etc. or a piezoelectric crystal. The second step or operation is the formation of the cuprous iodide film by immersing the copper coated article in iodine vapor.

Figure 2:
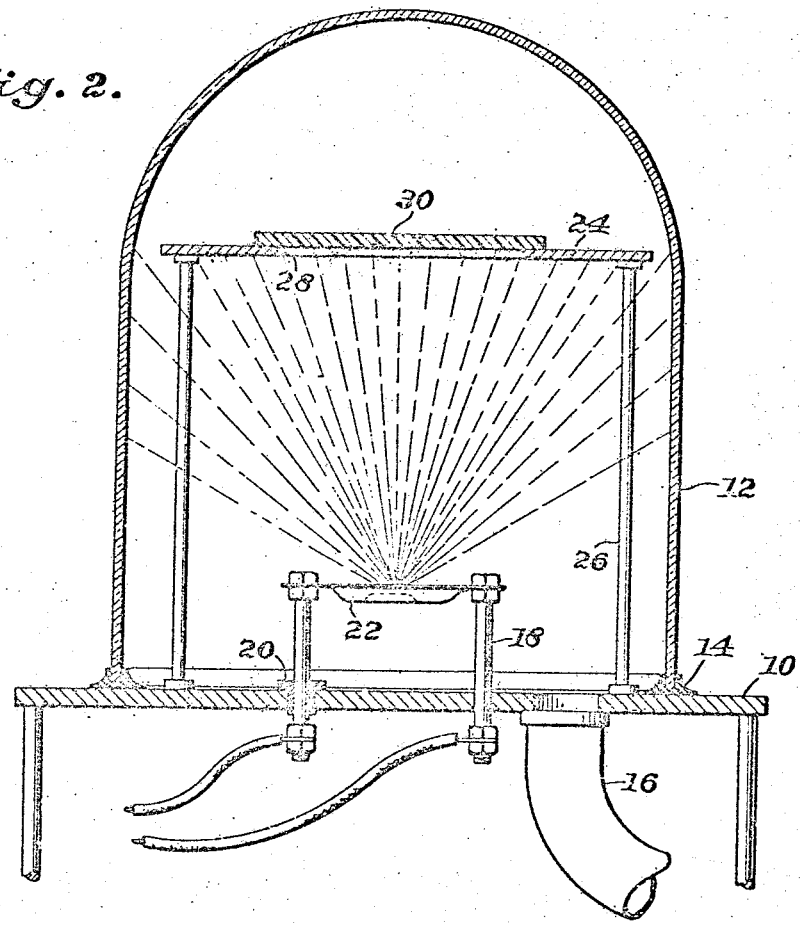
Figure 2 is a vertical cross-sectional view of apparatus suitable for the first stage of one of the preferred forms of the process of this invention.

One form of apparatus suitable for carrying out the first operation, namely, the copper coating of the article, is shown in Figure 2 of the drawings. This apparatus includes a flat polished base plate 10 which supports a bell jar 12 having a vacuum tight flexible gasket 14 around the circumferential open edge thereof and a conventional high vacuum pumping system (not shown in the drawings since it forms no part of this invention) attached to conduit 16 for exhausting air from the bell jar 12. The vacuum pumping system should be capable of exhausting the air in the bell jar to a pressure less than one micron of mercury. Supported within the bell jar 12 by means of electrode legs 18, at least one of which is insulated as at 20 from the supporting base plate 12, are one or more boats or troughs 22 which may, for example, be made of tantalum, tungsten, or molybdenum. Above the boats or troughs is positioned a platform 24 supported by legs 26. The platform 24 is provided with an opening 28 which may be of the size and shape of the film to be coated on an object such as sheet 30 supported at its edges by the platform 24.

In order to deposit a film of copper on an article such as 30 positioned on the platform 24, a piece of copper is placed in the boat or trough 22, the bell jar is placed in position on the platform 10 so that seal 14 is effective and the pumping system is then operated until the lowest pressure of which the apparatus is capable is obtained. This pressure is generally in the range of from 0.001 to 1 micron of mercury. Upon reaching the required low pressure, electric power is applied to heat the boat holding the small quantity of copper. The copper will melt and will generally bubble and sputter slightly until all of its dissolved gases have been eliminated. As soon as the molten globule of copper has ceased bubbling the power input to the boat is raised very quickly so that all of the copper in the boat may be evaporated as rapidly as possible. Rapid evaporation is preferred since it produces the densest film. The copper upon evaporation streams out into the vacuum chamber in all directions and forms a thin film on every surface that it strikes including the exposed surface of the article to be coated.

The above description of operation is, as stated, the preferred technique. However, it is possible to evaporate the copper slowly instead of rapidly and it is further possible to evaporate at higher pressures than those described. These departures from the method described theoretically at least should lead to a less dense film and perhaps a different distribution of the metal over the surface.

After the metallic copper film has been deposited the coated article is removed from the vacuum chamber and the first operation in accordance with Method I in producing an electrically conducting transparent film has been completed. Although the temperature at which the copper is caused to melt and evaporate is high, the temperature of the article being coated itself remains substantially at room temperature. The rapid evaporation of the copper and the relatively large distance separating the evaporating boat and the article to be coated does not permit the article to absorb an appreciable amount of heat.

The second operation to complete the process consists in immersing the article coated with the thin copper film into a vessel or chamber which contains iodine vapor. The iodine reacts quickly with the thin copper layer and changes the copper chemically into a film which consists essentially of cuprous iodide. As a result of this chemical action the copper color of the original metallic copper film may be transformed into a clear transparent film which is electrically conducting.

The temperature of the iodine vapor in the iodizing chamber determines to some extent the clarity and transparency of the final film. It is impossible to state a specific temperature at which the iodine vapor should be maintained since it will vary with the size, shape and mass of the article being coated, and the thickness of the copper film to be iodized. The correct temperature should generally be determined for each article by experimentation. Generally, I have found that the temperature of the iodine vapor should be within the range of from room temperature, i. e., 20° C. to 23° C., up to about 100° C. Very thin films may be formed by iodine vapor at room temperature. Thick films will require iodine vapor temperatures in the vicinity of 80 to 100° C. A general rule for the production of clear transparent film is that articles having considerable mass or size require higher temperatures than those which are small or have but little mass.

It is to be understood that the iodizing of the metallic copper film will take place at any desired temperature but for the clearest and most transparent films the optimum temperature should be determined by experimentation.

I have further determined that in order to obtain the clearest and most transparent films the article which is being coated should not be heated at all. Although the iodine vapor in the iodizing chamber may be heated as high as 100° C., the article being coated should be at room temperature or even cooled below room temperature when it is plunged into the iodizing chamber.

If the article is heated or if the iodine vapor temperature is not at the optimum value a cloudiness which appears as a bluish haze or milkiness forms in the film and detracts from its transparency. Theoretically it is believed that this cloudiness or milkiness in the film may be explained as the result of the formation of large crystals of cuprous iodide which diffuse and scatter light striking or passing through them. It is well known in the art of crystallography and metallography that slow reaction rates, high temperatures, and slow rates of cooling favor the growth of large crystals, whereas rapid reaction rates, low temperatures, and rapid rates of cooling favor the growth of small crystals. The combination of an elevated iodine vapor temperature and a cool article surface where the film is to be formed permits a rapid reaction rate and rapid cooling of the minute cuprous iodide crystals of which the film is composed. Both of these factors favor the formation of tiny crystals which give rise to clear transparent films free from cloudiness or milkiness.

A suitable chamber of the iodizing of very small articles may be an ordinary wide-mouth glass canning jar. A small quantity of iodine crystals is placed in the bottom of the jar which is then closed with a lid to prevent the escape of iodine vapor. The jar is then placed in an oven and heated to that temperature at which it has been determined by previous trials to be the best for production of the clearest film of the desired thickness. The iodine vapor will be visible in the jar as a purplish or dark brown gas. Upon reaching the proper temperature the jar is removed from the oven and the article to be iodized is quickly lowered into the jar for a few seconds during which time the copper film is changed by the heated iodine vapor into an electrically conducting transparent film of cuprous iodide.

Figure 3:
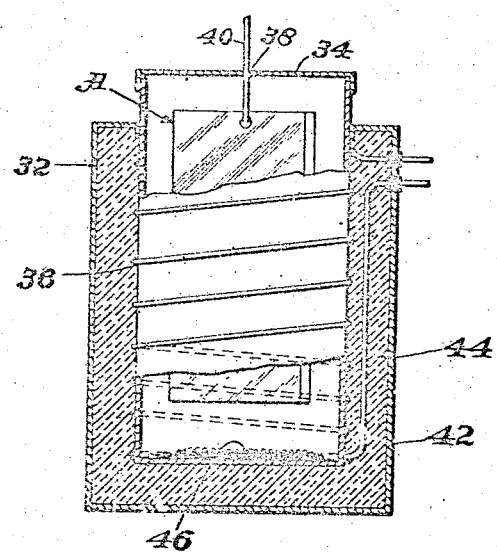
Figure 3 is a vertical cross-sectional view of apparatus suitable for the second and final stage of this form of the process.

Figure 3 diagrammatically illustrates a more refined chamber which has been constructed for iodizing copper films on sheets of acrylic plastic A having the dimensions of 7" x 11" x ⅛". This chamber consists of an inner iodizing box 32 having a top or lid 34 and heating means in the form of a coiled insulated resistance wire 36 surrounding the outside. A small opening 38 may be provided in lid 34 for the purpose of receiving a string or wire 40 for suspending sheet A. In order to prevent the loss of heat as well as to distribute the heat more uniformly throughout the iodizing box 32, a second box 42 is provided about the chamber 32 and the annular space between the boxes 32 and 40 may be filled with a suitable insulating material 44 such as glass wool.

The operation of the apparatus of Figure 3 is carried out by placing a few crystals 46 of iodine in the bottom of the chamber 32 and passing a current through the resistance wire 36 of sufficient amperage to produce a temperature of the optimum value which in the instance described is approximately 80° C. Upon attaining this temperature which may be measured by a thermometer inserted through the wall of chamber 32, the lid 34 is removed and the plate to be coated is quickly lowered into the hot iodine vapor. Immersion in the iodine vapor for a few seconds is sufficient to convert the thin copper film into a copper iodide film which is transparent and electrically conducting. Upon removal from the iodizing box 32 after completion of the reaction between the copper film and iodine, the surface may be colored dark brown because of excess iodine crystals which have condensed upon the surface, but these crystals evaporate quickly upon exposure of the plate to the air for a few moments.

In connection with my preferred method which has been described above along with the description of apparatus suitable for carrying out the method, it is important to determine the quantity of copper which must be evaporated in order to produce a film of a required thickness. Conversely, in order to prepare a cuprous iodide film of specific thickness, a definite quantity of copper must be evaporated. A convenient and simple method of controlling the quantity of copper to be evaporated is to use short measured lengths of standard copper wire of a convenient size. By evaporating the same length of wire using the same apparatus, conditions of temperature and pressure, arrangement of the copper containing boats, and distance from these boats at which the article to be coated is placed, the same thickness of film may be obtained and it is not necessary to weigh the copper or perform other tedious operations in order to obtain a uniform film each time articles are coated.

The final films of cuprous iodide as has been explained are exceedingly thin. The optical thickness should not exceed two wavelengths of light having a wavelength of 550 millimicrons if it is desired to obtain a transparent film. The amount of copper required to form such thin films is exceedingly small and consequently the amount of copper to be evaporated is also very small and it is desirable, therefore, to have a convenient means for accurately determining the required amount of copper.

No definite figure may be given to indicate the actual amount of copper which must be evaporated to produce a film of definite thickness because this figure will vary widely depending upon the geometry and the operation of the particular coating machine which is used as explained above. It is obvious that if the article being coated is supported ten inches from the evaporating boat in one machine while it is supported twenty inches away from the evaporating boat in another machine, then the quantity of copper to be evaporated in the latter machine must be greater than that in the former in order to obtain equal film thickness in the two machines. Furthermore, a plurality of evaporating boats may be used in order to obtain uniform film thickness over a large area. Each boat contributes its proportion of copper to the film. Consequently, it is obvious that the quantity of copper to be evaporated from each individual boat of a number of boats will not be the same as if the copper was to come from one boat or a smaller number of boats. Hence, it follows that the quantity of copper to be evaporated in order to obtain a film of specific thickness must be determined for each coating machine having different geometrical constructions and conditions of operation. Having once determined experimentally the amount to be evaporated for producing a coating of a particular thickness, then it is possible to produce films of uniform thickness as long as the geometrical arrangement of the coating machine and the conditions of operation are not disturbed.

In my particular coating apparatus, two evaporating troughs or boats were used and they were spaced about 15" apart. Each boat was about 3" above the surface of the base plate. The article to be coated was placed on a horizontal support about 17" above the surface of the base plate and symmetrically located with respect to the two boats beneath it. Bare copper wire, size No. 24 B and S gage, was used at all times, it being apparent that other sizes, of course, could have been used.

A cuprous iodide film ½ wavelength thick has a reddish-purple color by reflection as has been described, and this color may be used as a gage of film thickness. In order to obtain this particular thickness of film, an arbitrary length of No. 24 copper wire (for example 1½") was placed in each boat and evaporated onto a piece of glass. Glass is convenient to use for these experiments since it is transparent, hard, and may be used over and over again by cleaning off the old films. The copper film was then iodized in the manner described previously and the color of the reflected light was observed. If the color was not reddish-purple, the entire experiment would be repeated using slightly different lengths of wire. Proceeding in this manner I finally determined that for my particular equipment it was necessary to evaporate a 1¼₆" length of No. 24 copper wire from each boat in order to form a cuprous iodide film having a reddish-purple color by reflection.

Having determined the length of wire necessary to form a reddish-purple color by reflection, it is necessary to perform one more experiment in order to prove that the film is ½ wavelength thick and not some multiple of ½ wavelength. Films which are ⅔, ⅗, and ⅘ wavelengths thick also show this color but a film ½ wavelength thick is the thinnest film which will produce the same color. To perform this experiment, a length of wire which was exactly ½ that previously found to give a reddish-purple film should be evaporated and the copper film then iodized. If the resulting film is still reddish-purple, it indicates that the first choice of wire which produced a reddish-purple color film by reflection was producing a ⅔ or ⅘ wavelength film. If the resulting film is a brilliant yellowish-green, it indicates that the first choice was probably a ⅔ or ⅘ wavelength film. Further experiments would then be necessary in order to determine the shortest length of wire which could be evaporated to produce a reddish-purple film. If the resulting film has practically no color upon using a piece of copper wire exactly ½ the length of that determined for making the first reddish-purple color film by reflection the indication is that the length of the wire previously selected is correct for producing a film ½ wavelength in thickness.

Having thus determined the proper length of the wire to produce a film ½ wavelength thick it is easy to produce films of any other thickness by simply increasing or decreasing the length of the wire proportionately. Thus a film twice as thick can be made by evaporating twice the normal length of wire. A film ½ as thick may be made by evaporating ½ the normal length of wire.

METHOD II

In carrying out Method II the cuprous iodide film is formed in one operation upon the surface of the article in a vacuum chamber such as that described in connection with Figure 1 of the drawings by evaporating pure cuprous iodide powder. This method involves placing a quantity of cuprous iodide powder in the evaporating trough or boat and evaporating directly in a high vacuum. Evaporation proceeds at a dull red heat. It is necessary to place a considerable quantity of cuprous iodide in the boat because at the evaporating temperature, decomposition of the iodide into free iodine and free copper occurs rapidly. The iodine passes off as vapor while the metallic copper remains in the boat. The cuprous iodide which does evaporate without decomposition condenses on the surface which it strikes to form an electrically conducting film.

Although the films produced by this method are identical in transparency and electrical conductivity with those produced by Method I, method II possesses a number of disadvantages such as the wastage of cuprous iodide because of the described decomposition. Further, iodine vapor contaminates the pumping fluids in the vacuum pump and condenses in the cooler portion of the vacuum system. This contamination makes it difficult to obtain low pressures in the vacuum chamber and necessitates frequent cleaning of the entire vacuum system.

METHOD III

I have also discovered that transparent electrically conducting films of cuprous iodide may also be made by iodizing films of metallic copper which have been deposited from a chemical solution. For the purpose of depositing copper films on glass to make copper mirrors a number of formulas for preparing chemical solutions are known and all of these formulas have in common the reduction of a soluble salt of copper by a reducing agent incorporated in the solution. The free metal deposits as a film on objects immersed in the solution. As an example of one such solution which may be used is that which has been published by E. A. H. French in the "Transactions of the Optical Society" (London), volume 25, page 229 (1924). The chemicals of this formula were mixed in the following manner and proportions:

9 grams of hydrazine sulfate were dissolved in 150 cc. of distilled water heated to 60° C. and to this was added with constant stirring 90 cc. of a saturated solution of copper hydroxide in ammonia at room temperature. The resultant mixture should have a clear yellow color. To this solution was then added slowly and with constant stirring 87.5 cc. of a solution at 60° C. of 11.1 grams of pure potassium hydroxide in 100 cc. of distilled water. This solution should also be a clear yellow without any precipitate.

The article to be coated is placed in this solution and the solution heated very gently, preferably in a water bath. The color of the solution will gradually begin to change and the film of copper begins to deposit on all of the surfaces of the article in contact with the liquid. The only way to determine the thickness of the copper film is to withdraw the article from the solution and make measurements. Upon obtaining proper thickness of film the article is removed from the solution and is washed free of any adhering coating solution and then dried. After the film has dried it is diodized in accordance with the method as set forth in connection with the process of Method I.

Although I have successfully made films of cuprous iodide which are transparent and electrically conducting by this method it is the least desirable of the three methods because the thickness and uniformity of the copper film is difficult to control. The rate of deposition of the copper upon the surface of the article being coated is very sensitive to the cleanliness of the surface, the temperature of the solution, and the agitation of the solution. If the surface is not uniformly clean over its entire area, then the copper deposits faster in some places than in others and a non-uniform coating results. The thickness of the copper film is almost impossible to control because deposition occurs at the same time that the solution itself is changing color and becoming turbid and opaque as a result of the chemical reactions which are taking place in the liquid.

The above three methods for depositing a thin film of cuprous iodide on a supporting surface are the preferred methods. However, other methods may be used for applying a thin copper film to a surface for conversion to cuprous iodide. Among these methods are processes such as the "sputtering" process in partial vacuum, the pyrolitic decomposition of gaseous copper compounds, and where applicable, electrolytic methods. Any of these processes may be used where most convenient, and the scope of the invention is, therefore, not to be restricted by the illustrative methods of carrying out my process.

Each of the three methods described is not applicable indiscriminately to all substances which are to be coated. For example, either Method I or Method II may be used for forming cuprous iodide films on materials which are water-soluble, such as alkali halide crystals or those of the phosphate type, but the chemical method, Method III, would obviously be unsuitable, since the crystals would dissolve in the aqueous copper depositing solution. Materials which are insoluble in water and are not affected by the chemicals dissolved in the solution of Method III, may be filmed by the chemical method. Glass and ceramics, since they are insoluble in water and inert to most chemicals, may be conveniently filmed by all three methods described.

The above process including the three specifically described species and modifications thereof when followed produces an electrically conducting coating or film on a surface of a supporting material without the necessity of using high temperatures for deposition such as those used by the prior art. Furthermore, the coatings or films applied to the supporting surfaces may be made transparent and transmit a very high percentage of visible light incident upon them.

The supporting surfaces coated with the films of this invention in accordance with the process of this invention possess a variety of uses. For example, I have outlined below specific examples of particular applications of the coated materials of this invention. Other uses than those outlined will, of course, become apparent to those skilled in the art.

Example I

Accumulated static charges on various surfaces often offer disadvantages which are difficult to overcome. If these surfaces, however, are coated by the cuprous iodide films of this invention it is possible to prevent the accumulation of static charges and overcome the difficulties encountered. In view of the wide variety of surfaces which may be conveniently coated with cuprous iodide, including heat sensitive surfaces, it is apparent that the number of applications for the concept of dissipating electrical charges is many fold.

A specific example of a difficulty often prevalent is the accumulation of a static electrical charge on the sight window of a sensitive electrical or mechanical meter which occasions interference with the needle swing of the meter and thereby causes errors in the reading of the same. By coating this sight window with a transparent electrically conducting cuprous iodide film as described herein, the electrical charges are prevented from accumulating.

In the drawings, Figure 4 diagrammatically illustrates one form of a meter 48 equipped with a sight window 50 of transparent plastic or glass having a coating of cuprous iodide 52. It is preferable to coat the inside surface 54 of the sight window 50 in order to properly prevent the accumulation of static electrical charges which would interfere with the needle 56. Furthermore, the coating on the interior surface of a sight window prevents mechanical injury to the coating which might occur if it were on the outer surface. It is apparent, of course, that the coating may be applied to both surfaces if desired.

Example II

Another difficulty which is caused by electromagnetic wave energy may be overcome by the use of the coated objects of this invention as shields. These shields may be applied at the source of the emanation of the electromagnetic wave energy or they may be applied, for example, around equipment liable to be affected by the electromagnetic wave energy such as high frequency equipment, for example, radar and television.

High frequency equipment may be shielded from electromagnetic wave energy emanating from gaseous discharge lamps such as mercury lamps, neon lamps and fluorescent lamps by providing the gaseous lamp with a light opening covered with a transparent plastic or glass having an electrically conducting transparent film of this invention on a surface thereof. The film should be appropriately grounded by the connection of a conductor to the film by means such as previously described. This ground connection may be made by electrically connecting the conducting film to the casing surrounding the light source which itself is normally grounded. The interference with radar and television or other high frequency equipment may also be overcome by providing a grounded shield of a solid material coated with cuprous iodide about the high frequency equipment. It is to be pointed out, of course, that disturbances occasioned by electromagnetic wave energy and not disturbances occasioned by electrical circuit feed backs may be eliminated as described.

For the purpose of specifically illustrating the use of the coated articles of this invention as electromagnetic wave energy shields there is shown in Figure 5 a metallic casing 58 containing a gaseous discharge lamp, such as fluorescent light 60, provided with a transparent glass or plastic light covering 62 coated with the cuprous iodide film 64 of this invention. The conducting cuprous iodide coating or film is grounded by an electrical conductor 66 which, as shown, is connected to the metallic casing 58 which is in turn grounded as at 68. This construction permits light to pass through the window but prevents electromagnetic wave energy from passing through it and interfering with high frequency equipment.

As shown in Figure 5, the cuprous iodide film 64 is coated on the outer surface of the glass or plastic light covering 62. It is apparent that this coating or film 64 may be formed on the inner surface of the light covering 62 and this is sometimes desirable in order to avoid possible mechanical injury to the film. A preferred means for protecting the cuprous iodide film 64 on the outer surface of the light covering 62 is to cover this film with a plastic or glass sheet.

Example III

Another example of the use of this invention is to provide electrodes for dielectric materials in order to form devices which may be generically classed as electrical condensers. An electrical condenser is generally understood to consist of a dielectric material positioned between two electrically conducting electrodes so that when a potential difference is applied between the two electrodes, the dielectric material is subjected to electrical stresses. The chief advantage of this invention is that the electrodes in such a condenser arrangement may be made of transparent films of cuprous iodide in accordance with the teachings of this invention. Furthermore, the cuprous iodide electrode may be formed directly upon the surfaces of the dielectric so as to be in intimate contact therewith, if desired.

In the drawings, Figure 6 is an example of a condenser of this invention which comprises a dielectric material 70 coated on opposite sides thereof with a conducting film of cuprous iodide 72.

A particular application of this invention is in the construction of a light valve in which the dielectric material 70 of Figure 6 is transparent and has piezoelectric properties and the electrodes 72 are transparent cuprous iodide films. Examples of dielectric materials having piezoelectric properties are ammonium dihydrogen phosphate, potassium dihydrogen phosphate, Rochelle salts, quartz, etc.

Heretofore many attempts have been made to produce transparent electrodes. For example, a piezoelectric crystal has been placed between two pieces of glass which have on their surfaces an electrically conducting transparent film known in the trade as "Nesa." Because of the high temperature required for preparing the conducting "Nesa" layer, the glass is distorted and optical contact with the piezoelectric crystal is virtually impossible. Others have attempted to solve the problem by the application of a thin film of evaporated gold on the surface of the piezoelectric crystal. No matter how thin the evaporated layer of gold, however, the reflection and absorption losses are so large that this type of transparent electrode is not desirable and more transparent electrodes have been the aim of the art.

Glycerine has been used as the transparent electrode but it has the disadvantages associated with the use of liquids and the resulting electrodes, although satisfactory electrically, are not permanent in nature. Metallic grids which permit light to pass through apertures or interstices of various shapes have also been used.

By following the teachings of this invention, one may apply uniform electrically conducting electrodes upon the appropriate surfaces of the crystal which are in optical contact with the surfaces and which provide essentially equi-potential electrode surfaces. Furthermore, these electrodes of cuprous iodide are capable of transmitting an unusually high percentage of the light which is incident thereon, as previously indicated.

U. S. Patent 2,467,325 describes the construction of various types of light valves which may be in the form of a single plate or in the form of a more complicated arrangement in which a plurality of plates are used in a pile or stack. For the purpose of eliminating repetition, it is to be understood that the teachings of U. S. Patent 2,467,325 are incorporated in the disclosure of my invention, it being apparent therefore that transparent dielectric materials possessing piezoelectric properties and coated with transparent electrodes of cuprous iodide may be substituted for the structures illustrated in the cited patent.

Another application of the transparent electrodes of this invention used in connection with a piezoelectric crystal as a light valve is as a shutter in a high speed camera as described by Gunter in the Journal of the Optical Society of America, vol. 38 (1948), beginning on page 419.

Still another application of the transparent electrode of this invention used in connection with a piezoelectric crystal as a light valve is placing sound on film as described by Gotschall in the Journal of the Society of Motion Picture Engineers, vol. 51 (1948), beginning on page 13.

Another application of the transparent electrodes of this invention used in connection with a piezoelectric crystal is in the modified Lyot filter (a birefringent type filter) used in the study of solar prominences and described by Billings in Journal of the Optical Society of America, vol. 37 (October, 1947), beginning on page 738.

Other specific uses of the coated articles of this invention will become apparent to those skilled in the art and I do not, therefore, wish to be limited to those disclosed above which are for the purpose of illustration only.

I claim:

1. A process for producing an electrically conducting coating on a surface of a solid inert insulating body which comprises the steps of exposing said surface to an atmosphere of copper vapor and then exposing the resulting copper coated surface to iodine vapor.

2. A process for producing an electrically conducting transparent coating on a surface of a solid inert insulating body which comprises the steps of exposing said surface to an atmosphere of copper vapor and then exposing the resulting copper coated surface to iodine vapor, the optical thickness of the resulting cuprous iodide coating being from about ¼ to about 2 wavelengths of monochromatic light having a wavelength of 550 millimicrons.

3. A process for producing an electrically conducting coating on the surface of a solid inert insulating body which comprises the steps of exposing said surface under substantially vacuum conditions to an atmosphere of copper vapor and then exposing the resulting copper coated surface to iodine vapor.

4. A process as set forth in claim 3 wherein said electrically conducting coating is transparent and has an optical thickness of from about ¼ to 2 wavelengths of monochromatic light having a wavelength of 550 millimicrons.

5. A process for producing an electrically conducting coating on a surface of a solid inert insulating body which comprises the steps of exposing said surface at substantially room temperature under substantially vacuum conditions to an atmosphere of copper vapor and then exposing the resulting copper coated surface which has a temperature of from about 20° C. to 23° C. to iodine vapor.

6. A process as set forth in claim 5 wherein the temperature of said copper coated surface exposed to said iodine vapor is cooled below about 20° C. to 23° C.

7. A process as set forth in claim 6 wherein the temperature of said iodine vapor is from about 20° C. to 100° C.

8. A solid inert insulating body having on a surface thereof an electrically conducting coating which consists essentially of cuprous iodide.

9. A transparent solid inert insulating body having on a surface thereof an electrically conducting coating which consists essentially of cuprous iodide.

10. A heat sensitive solid inert insulating body having on a surface thereof an electrically conducting coating which consists essentially of cuprous iodide.

11. A solid inert insulating body having on a surface thereof a transparent electrically conducting coating which consists essentially of cuprous iodide.

12. A solid inert insulating body having on a surface thereof a transparent electrically conducting coating of cuprous iodide having a thickness of from about ¼ to 2 wavelengths of monochromatic light of a wavelength of 550 millimicrons.

13. An electromagnetic wave energy shield comprising a solid inert insulating body having on a surface thereof an electrically conducting coating which consists essentially of cuprous iodide, said coating being grounded by the connection of a conductor from the coating to ground.

14. A condenser comprising a dielectric material having coated on opposite surfaces thereof electrodes of cuprous iodide.

15. A light valve comprising a transparent electro-optic crystal having opposed surfaces thereof coated with transparent electrodes of cuprous iodide.

16. An electromagnetic wave energy shield as in claim 13 wherein both the said insulating body and the said cuprous iodide coating are transparent.

17. A meter sight window having means for preventing the accumulation of static electrical charges on the surface thereof which comprises a transparent inert insulating body having a grounded electrically conducting transparent coating of cuprous iodide on a surface thereof.

References Cited in the file of this patent

UNITED STATES PATENTS

| | | |
|---|---|---|
| 1,694,276 | Mohrle | Dec. 4, 1928 |
| 1,947,112 | Ruben | Feb. 13, 1934 |
| 1,964,322 | Hyde | June 26, 1934 |
| 2,002,221 | Van Geel et al. | May 21, 1935 |
| 2,026,086 | Farncomb | Dec. 31, 1935 |
| 2,055,584 | Okolicsanyi | Sept. 29, 1936 |
| 2,118,795 | Littleton | May 24, 1938 |
| 2,175,016 | Brunke | Oct. 3, 1939 |
| 2,239,452 | Williams et al. | Apr. 22, 1941 |
| 2,352,085 | Dimmick | June 20, 1944 |
| 2,366,687 | Osterberg | Jan. 2, 1945 |
| 2,428,600 | Williams | Oct. 7, 1947 |
| 2,429,420 | McMaster | Oct. 21, 1947 |
| 2,467,325 | Mason | Apr. 12, 1949 |
| 2,493,200 | Land | Jan. 3, 1950 |
| 2,498,003 | Paterson | Feb. 21, 1950 |
| 2,577,935 | Waggoner | Dec. 11, 1951 |